United States Patent [19]
Baumann

[11] 3,811,173
[45] May 21, 1974

[54] METHOD OF MANUFACTURING TANKS FOR LIQUIDS

[76] Inventor: Bernard Baumann, 15 Avenue de Friedland, Paris 8e, France

[22] Filed: Apr. 24, 1972

[21] Appl. No.: 246,856

[30] Foreign Application Priority Data
Apr. 26, 1971  France .............................. 71.14842

[52] U.S. Cl. ..................... 29/460, 220/10, 264/45, 264/261
[51] Int. Cl. ........................ B23p 3/00, B23p 19/04
[58] Field of Search ............. 220/20, 9, 9 F, 10, 16, 220/17, 9 A, 20.5, 72; 29/460; 264/261, 45

[56] References Cited
UNITED STATES PATENTS

| | | | |
|---|---|---|---|
| 2,576,208 | 11/1951 | Benson | 220/16 X |
| 3,016,129 | 1/1962 | King | 220/16 X |
| 3,137,744 | 6/1964 | Burrus | 264/45 |
| 3,229,359 | 1/1966 | Kramer | 29/460 X |
| 3,411,191 | 11/1968 | Ikert et al. | 264/45 |
| 3,446,385 | 5/1969 | Ponemon | 220/72 X |
| 3,627,162 | 12/1971 | Dossin | 264/45 X |
| 3,717,922 | 2/1973 | Witkowski | 29/460 X |

*Primary Examiner*—Charlie T. Moon

[57] ABSTRACT

This invention is addressed to a method for the manufacture of mobile tanks for liquids wherein the tanks are equipped with at least one stabilizer or baffle and the tanks are formed of a metal outer wall, a plastic inner wall and a core of plastic foam in which the metal outer wall and a pre-formed plastic inner wall having a portion corresponding to the inner surface of the outer wall and a portion defining at least one baffle are positioned such that the portion of the inner wall corresponding to the inner surface of the outer wall is in surface contact therewith whereby the portion of the inner wall defining the baffle defines a substantially closed space between the inner and outer walls, and a foamable plastic material is supplied to the space to substantially fill the space with a plastic foam.

3 Claims, 14 Drawing Figures

METHOD OF MANUFACTURING TANKS FOR LIQUIDS

This invention relates to a method of making mobile tanks for liquids and to the tanks obtained.

The invention is generally concerned with the field of containers for liquids.

In general, mobile tanks for liquids and, more particularly, fuel tanks are made of metal. Accordingly, they show favorable mechanical properties and are sufficiently resistant to fire.

Tanks made of lead-containing steel are readily formed by stamping and can be seam-welded which enables a liquid-tight joint to be obtained. However, they are subject to corrosion under the effect of the fuels which they contain, are heavy and, in the event of fire, explode on account of their high melting point.

Aluminum and its alloys can readily be formed by stamping, but, unfortunately, they are difficult to seam-weld; spot-welding does not provide for adequate liquid-tightness. On the other hand, aluminum and its alloys are not subject to corrosion.

Tanks made of plastics materials can readily be formed by stamping and are eminently suitable for seam-welding. They are completely liquid-tight and do not undergo corrosion. In addition, they do not explode in the event of fire because the material melts at a relatively low temperature. On the other hand, they are vulnerable on contact with a dividing plate, show inadequate resistance to abrasion under the effect of the friction generated by the dividing plates, age quickly in contact with any sand, stones or hot tar thrown against their surfaces and, finally, show poor mechanical properties and are readily affected by fire.

It is known to manufacture composite tanks comprising an outer wall of metal and an inner wall of plastic. The assembly derives its favorable mechanical properties from the outer wall, which acts as a support, and its liquid-tightness and resistance to corrosion from the inner wall. In addition, if the outer wall is not liquid-tight, the composite tank does not explode by virtue of the fact that the plastic inner wall melts under the effect of the heat and the outer wall allows the fuel to escape.

Mobile tanks are equipped with elements known as stabilizers which are intended to counteract the movements of the liquid under the effect of longitudinal or transverse acceleration by the vehicle which carries the tank. These stabilizers are in the form of vertical plates which divide the interior of the tank into compartments communicating with one another through narrow passages. In the case of metal or plastic tanks, these stabilizers are formed by plates made of the same material as the tank which are either welded or cemented in place. In the case of composite tanks, the problem is more difficult since the plastic inner wall cannot be cut to fix the metal stabilizers to the outer wall because this would deprive the assembly of its resistance to corrosion. Stabilizers made of a plastic material simply fixed to the inner wall would lack the necessary resistance and the stresses applied by the stabilizers to the inner wall would be sufficient to tear open the inner wall in the event of above-average acceleration.

One solution to this problem is described in our co-pending U.S. application Ser. No. 73,466, filed Sept. 18, 1970, now U.S. Pat. No. 3,686,342. This application relates to a method of making a tank comprising an outer wall of aluminum alloy coated internally with a thermoplastic material. The first step of this process is to make a hollow metal body to which porous, permeable intermediate elements in the form of a plastic foam that has been cut to size are fixed in order to form the stabilizers, after which a sheet of thermoplastic material is applied to the assembly thus obtained and, finally, a vacuum is set up between the hollow body and the sheet of thermoplastic material. A tank is obtained by assembling two sections thus obtained, on the one hand by liquid-tight welding of the two plastic inner walls and on the other hand by assembling the outer shells.

This process is attended by a few disadvantages arising both out of the high cost and out of the disproportionate amount of time taken in creating the vacuum. In addition, creation of the vacuum calls for extreme fluid tightness between the outer hollow body and the sheet of plastics material which in turn calls for a flat contact surface. Finally, the stabilizer must not go beyond the plane of contact which limits its height. It should also be pointed out that the intermediate foam body which forms the stabilizer does not adhere to the inner wall which reduces the strength of this element and necessitates an increase in its thickness.

It is accordingly an object of the present invention to produce and to provide a method for producing tanks for liquids which overcome the foregoing disadvantages.

It is a more specific object of the invention to produce and to provide a method for producing mobile tanks for liquids where the tanks include at least one stabilizer and comprise a metal outer wall, a core of plastic foam formed in situ in a simple and economical manner.

These and other objects and advantages of the invention will appear more fully hereinafter, and, for purposes of illustration but not of limitation, embodiments of the invention are shown in the accompanying drawings in which:

FIGS. 7 to 9 show another embodiment of a fuel tank.

FIGS. 10 and 11 show part of a tank comprising an outer wall and an inner wall confined to a zone comprising a wall for stabilizing the liquid accommodated in the tank.

In the method according to the invention, there is placed against a metal outer wall of generally simple shape a pre-formed inner wall of plastic material which is identical over part of its surface with the inner surface of the outer wall but which comprises at least one of the stabilizers or all the stabilizers so that that part of its surface which is identical with the inner surface of the outer wall is in contact with this inner surface, after which components whose reaction gives rise to the formation of an expanded foam are injected into the empty space between the two walls.

The tank according to the invention comprises a metal outer wall of simple shape, an inner wall which is identical over part of its surface with the inner surface of the outer wall but which comprises one of the stabilizers or all the stabilizers and a core of expanded foam in the empty space between the two walls.

In the drawings, the same components are denoted by the same reference numerals.

Figure 1:
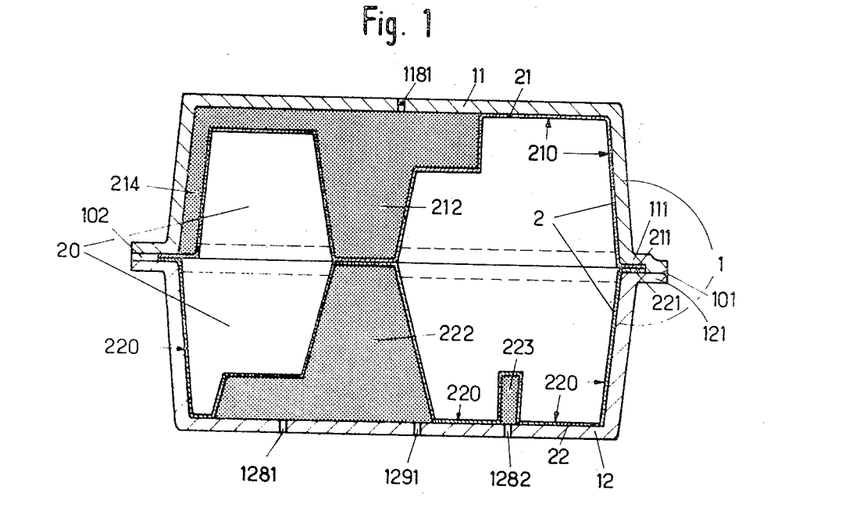
FIG. 1 is a section through one simple embodiment of the tank according to the invention.

The simple tank shown in FIG. 1 comprises an outer wall 1 and an inner wall 2. The outer wall 1 which is generally simple in shape, i.e., it does not comprise the stabilizers, is made up by two half-walls 11 and 12. The inner wall 2 comprises two half-walls 21 and 22 each of which is made of a thermoformed sheet of plastics material. These two inner half-walls 21 and 22 are provided with two flat flanges 211 and 221 assembled in liquid-tight manner, for example by ultra-sonic welding. The inner wall 2 is placed inside the two outer half-walls 11 and 12 before they are assembled, after which the two outer half-walls, each of which is provided with a flange 111 and 121, respectively, are assembled in a non-liquid-tight manner, for example by electrical spot welding 101.

Over a large part 210-220 of its surface, the outer surface of the inner wall 2 is identical with the inner surface of the outer wall 1 so that, once it has been placed inside the outer wall 1, it conforms closely thereto. The inner wall also comprises the liquid stabilizers 212, 222 and 223 and the channels 214 required for firmly fixing the inner wall to the outer wall.

The components which react together to give the plastic foam are then injected, for example through openings such as 1181 in the half-wall 11, 1281 and 1282 in the half-wall 12, the air being removed through openings such as 1291 and through the permeability of the weld seam 101. It is also possible, and preferred, to provide a closable channel 102 for injection of the components in accordance with the process described in our French Patent Application 71 14.134 filed 21st April, 1971.

In both cases, the foam expands in the spaces between the metal walls and the plastic sheets opposite the stabilizers and the channels 214. Accordingly, these spaces are made up of three components. In the zones corresponding to the sections 210-220 of the inner wall, the two metal half-walls are only lined by the sheets of plastic material applied directly to them. Accordingly, these zones only comprise two components. The injection channel 214 acts like a "skeleton" intended to perform a double function, firstly to feed the filling spaces such as 212 with components before expansion and secondly to act as an adherence structure between the metal and plastic walls.

In the majority of cases, there is no need for the evacuation openings such as 1291 insofar as the permeability of the weld seam of 101 is generally sufficient for removal of the air or gases during expansion.

A variety of different materials are suitable for injection, including flexible, semi-rigid and rigid polyurethane foams with a skin of varied thickness, or even expandable plastics materials such as polyamides, polyolefins.

The circulation of a gas inside the hollow body, introduced for example through a filling and emptying tube (not shown), enables the thicknesses of the skin to be regulated independently of the heating of the metal outer wall. In addition, the pressure of this gas counteracts excessive deformation of the sheets of plastic material under the expansion pressure. It amounts for example to 0.6 bar for a polyurethane expansion pressure of 0.4 bar.

In a tank according to the invention, the outer wall 1 is obtained by stamping a 0.6 mm thick sheet of aluminum alloy containing approximately 2 percent of copper and 1 percent of magnesium. The inner wall 2 is thermoformed from two sheets of low-pressure polyethylene 1.8 mm thick, while the core is formed by expanded polyurethane.

The adherence obtained is highly satisfactory, particularly where expansion takes place under pressure. It can be improved even further by particular local forms given to the two walls.

Figure 2:
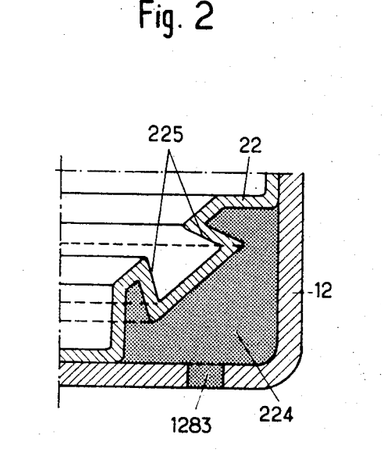
FIGS. 2 to 4 similarly illustrate details capable of improving adherence of the foam to the walls.

According to FIG. 2, one of the inner half-walls, for example 22, can comprise opposite tapers 225 obtained by thermoforming which provide for anchorage of the foam in the channel 224. The constituents are injected through an opening 1283. This arrangement is particularly useful in cases where the foam used adheres to the metal wall but not to the plastic wall.

Figure 3:
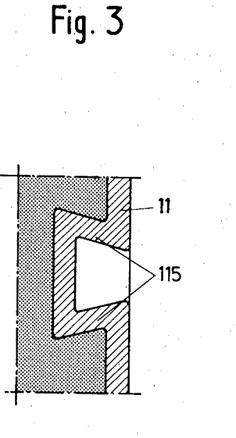

Conversely, in cases where the foam adheres to the plastic wall but not to the metal wall such as 11, the metal wall can be provided, as shown in FIG. 3, with opposite tapers 115 which provide for a firm connection between the foam and the metal wall.

Figure 4:
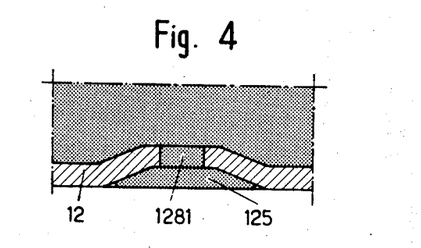

As shown in FIG. 4, it is also possible to use injection openings 1281 and/or completely open holes in order to anchor the foam for example on the two surfaces of the metal wall 12 in an outer, preferably circular recess 125.

In cases where the outer wall is made of steel, it must be completely covered by the inner plastic wall for protection against corrosion. In cases where the outer wall is made of aluminum or one of its alloys, the cover provided by the inner plastic wall need only be partial because there is no longer any danger of corrosion.

Figure 5:
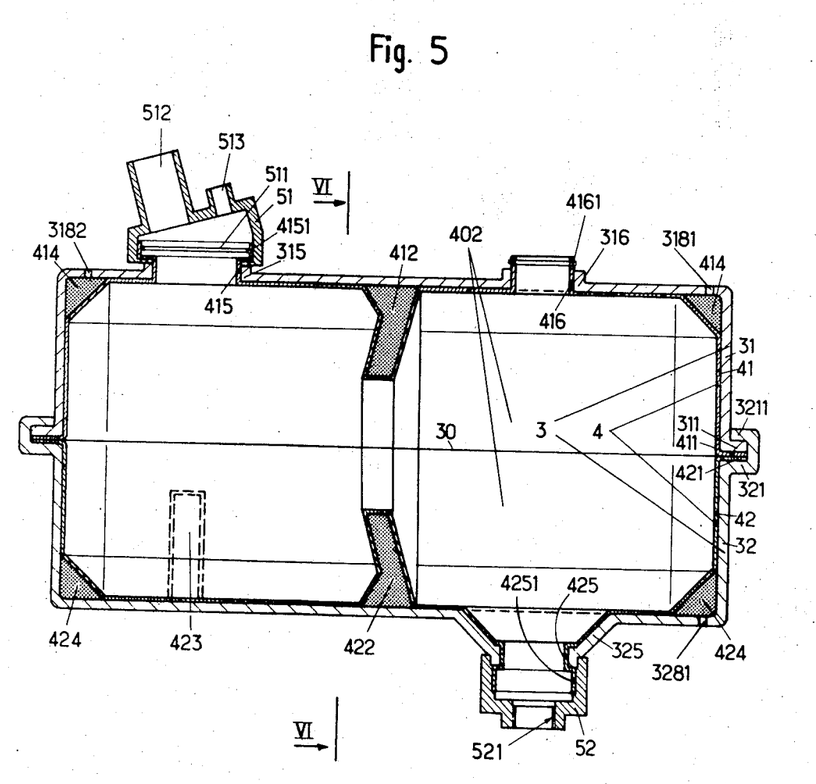
FIG. 5 shows a complete fuel tank.
Figure 6:
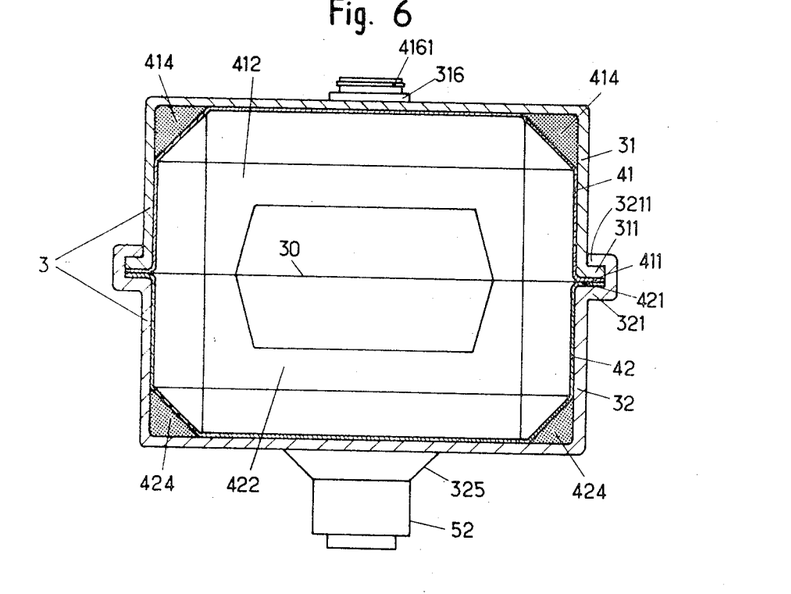
FIG. 6 is a section on the line VI of FIG. 5.

As shown in FIGS. 5 and 6, a complete fuel tank comprises a metal outer wall 3 and a plastic inner wall 4. The outer metal performs a supporting and protective function, while the inner plastic material provides for liquid-tightness. . . . . The tank also comprises a stabilizer, preferably consisting of an oppositely tapered wall, defining a settling tank for the liquid-level indicator, and one or more additional liquid stabilizers.

The outer wall 3 comprises on the one hand an upper half-wall 31 limited at its lower end by a contact plane 30 and comprising a narrow assembly flange 311, and on the other hand a lower half-wall 32 limited at its upper end by the same contact plane 30 and comprising an assembly flange 321 of considerable width. The two half-walls are assembled by crimping, the flange 321 of the lower half-wall being turned back at 3211 about the flange 311 of the upper half-wall.

The inner wall 4 comprises on the one hand an upper half-wall 41 limited at its lower end by the contact plane 30 and comprising a narrow assembly flange 411, and on the other hand a lower half-wall 42 limited at its upper end by the contact plane 30 and comprising an assembly flange 421 identical in width to the flange 411. These two half-walls are assembled by liquid-tight ultra-sonic welding. Each inner half-wall conforms closely to the shape of the inner surface of the corresponding outer half-wall, except for the channels imposed by the need for firm adherence to the outer wall, namely a channel 414-424 triangular in section along all the edges, and the stabilizers 412 and 422 which define a settling tank 402 accommodating the liquid-level indicator and, optionally, one or more additional liquid stabilizers such as 423.

The outer wall 3 is provided with openings through which fittings can be fixed and/or introduced. The upper half-wall 31 comprises a first opening 315 to which corresponds in the lower half-wall 41 an opening 415 whose wall closely conforms to that of the opening 315 and which is provided with a cylindrical extension 4151 enabling an element 51 which is molded by injection and which comprises sockets 512 for introducing fuel and 513 for removing air and pumping fuel, to be fixed by an internal locking mechanism 511, optionally reinforced by cementing. The upper half-wall 31 also comprises a second opening 316 to which corresponds an opening 416 in the inner half-wall 41 whose walls conform closely to those of the opening 316 and which is provided with a cylindrical extension 4161 designed to receive a mechanism for indicating the fuel level. This extension 4161 can either be screw-threaded or provided with an external locking mechanism. The outer half-wall 32 is provided with an opening 325, shown in frustoconical form, to which corresponds an opening 425 in the inner half-wall 42 whose walls closely conform to those of the opening 325. This opening 425 is extended by a cylindrical element 4251 which carries a molded coupling 52 which is welded by ultra-sonic welding and which is provided with a screwthread 521 designed to receive a closure plug (not shown). The tank is emptied through this opening.

The fittings, namely the molded element 51, the fuel-level indicator and the emptying socket 52 can also be rendered integral with the outer wall 3 or even with the two outer and inner walls 3 and 4.

The outer wall is completed by forming injection openings 3181 and 3182, as by drilling, for the half-wall 31 and 3281 for the half-wall 32.

The two inner half-walls 41 and 42 are first of all assembled by liquid-tight ultra-sonic welding. The two outer half-walls 31 and 32 are placed in position around the inner wall 4 thus formed with the various openings exactly in position, after which these two half-walls are joined by crimping 3211, and finally the constituents intended to form the foam by reacting in situ are injected through the openings 3181, 3182 and 3281.

In a modification, the components can be injected through a nozzle in accordance with Patent Application 71 14.134 to which reference has already been made.

The outer wall is stamped from a sheet of aluminum or one of its alloys, from a sheet of treated or leaden steel or from a sheet of copper alloy. The inner wall is obtained by thermoforming two sheets of a plastic material, such as a polyolefin, a polyamide optionally reinforced with polyvinyl chloride. The element 51 consists of a molded polyamide and the element 52 of molded polyvinyl chloride.

It is also possible to make a fuel tank comprising an outer wall formed by assembling two half-walls and an inner wall which only covers one of the outer half-walls and which comprises the liquid stabilizers of the tank.

Figure 7:
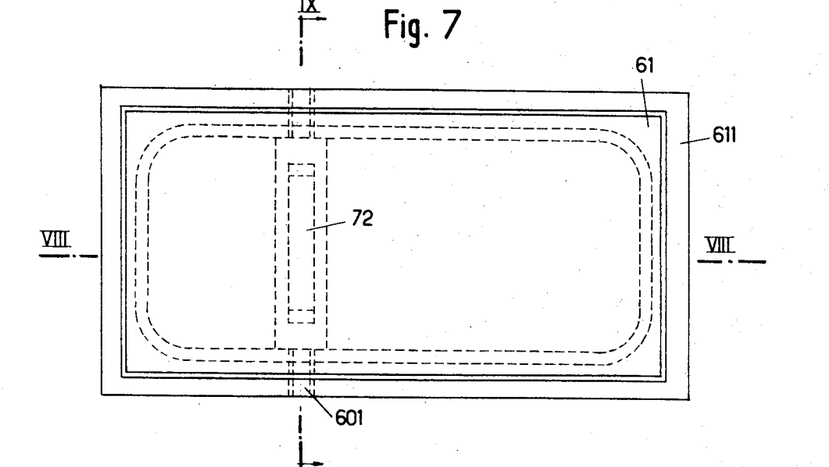
Figure 8:
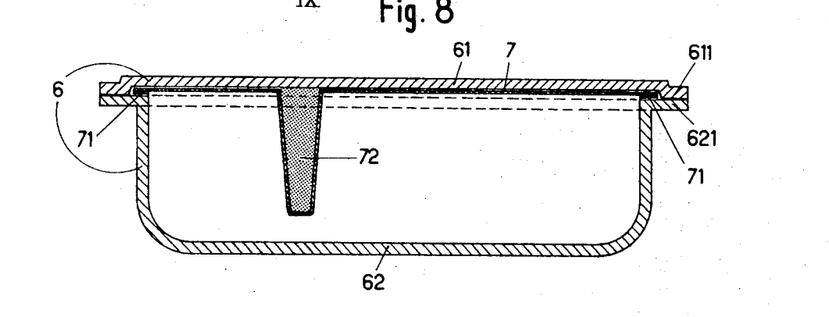
FIGS. 8 and 9 are sections on the lines VIII and IX, respectively, of FIG. 7.
Figure 9:
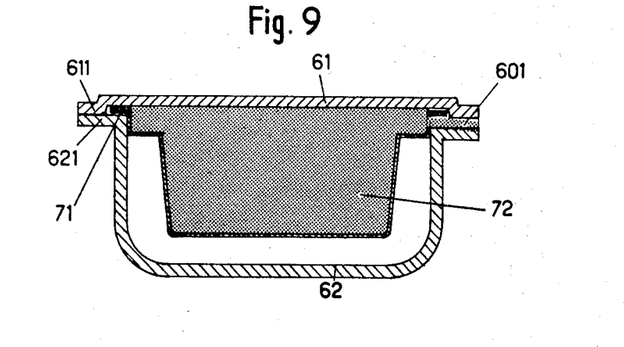

The fuel tank shown in FIGS. 7 to 9 comprises on the one hand a metal outer wall 6 formed by the assembly, through their respective flanges 611 and 621, of two half-walls of which the upper half-wall 61 is flat while the inner half-wall 62 forms a hollow body of which 61 is the cover, and on the other hand an inner plastic wall 7 which only covers the inner surface of the flat upper half-wall 61. This inner wall 7 is folded along all its edges at 71 and is held by crimping these folded edges 71 between the edges of the outer half-walls 61 and 62. The inner wall 7 is deformed to form a stabilizer 72. After the inner wall and the two outer half-walls have been placed in position, the constituents of the foam are injected through a closable injection nozzle 601 formed opposite the stabilizer 72 by the edges 611 and 621 of the two outer half-walls 61 and 62. That part of the surface of the inner wall 7 which is situated outside the stabilizing wall 72 is completely applied against the outer half-wall 61 directly, i.e., without any foam in between.

Lining of the outer wall by an inner wall can be localized to zones comprising local structures.

Figure 10:
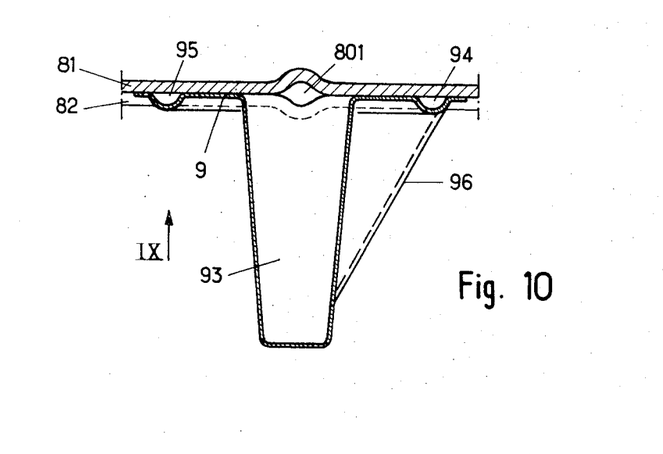
FIG. 10 is a section and FIG. 11 a plan view.
Figure 11:
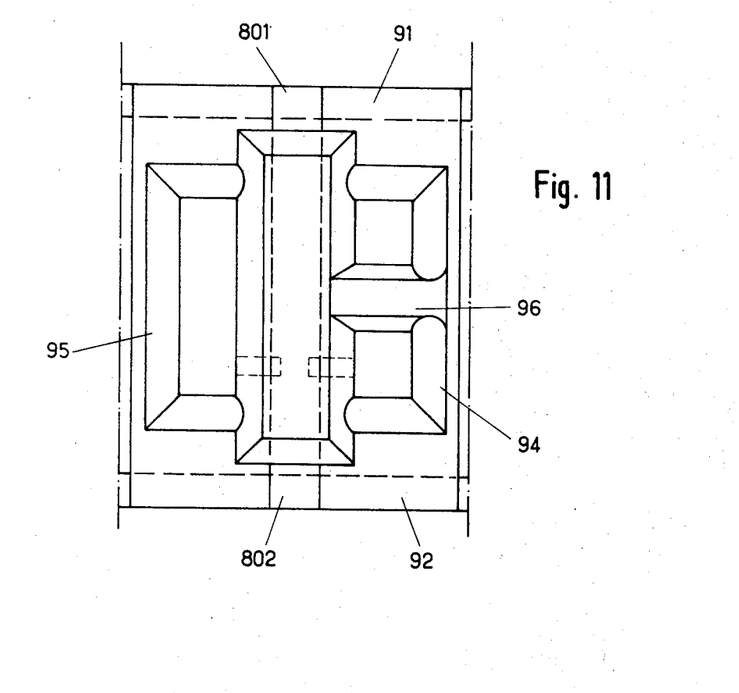

As shown in FIGS. 10 and 11, FIG. 11 being a view taken from the bottom towards the top of FIG. 10, two metal sheets 81 and 82, of which one is cut, contain a thermo-formed plastic sheet 9 at only two of their ends 91 and 92. The sheets 81 and 82 are deformed to form between them two channels 801 and 802 which can be closed by flattening and of which one is used to inject the plastic foam while the other is used to remove the gases given off in the presence or absence of reduced pressure. The plastic sheet 9 is formed to define a space 93 acting as a stabilizer for the liquid accommodated in the tank of which the element described and illustrated forms a part. Since this stabilizer can undergo severe stressing when the vehicle carrying the tank corners or accelerates, it is supported on the one hand by lateral channels 94 and 95 and on the other hand by a strengthening member 96.

Naturally, the internally unlined walls are made of a metal that does not corrode under the effect of the liquid accommodated in the tank, such as aluminum or one of its alloys.

On the other hand, mobile fuel tanks have to satisfy certain safety requirements relating to the filling tube, namely:

In the event of impact, the fuel-filling pipe must remain integral with the tank without any leaks being developed;

the fuel accommodated in the tank should not escape through the tube;

evaporation of the fuel in the tank should be reduced to a minimum;

the dangers of explosion should be minimized.

The tube by which the tank is filled with fuel is often made of an elastomeric material and has an end designed to be introduced under force into the tank. The mechanical properties of a coupling such as this are limited in the extreme.

A non-return valve and a filtration system which promotes condensation of the hydrocarbon gases are often incorporated in the filling tube. These components, situated outside the tank, are fragile and require special protection against cuts from the plates and against the impact of any stones that may be thrown up.

Figure 12:
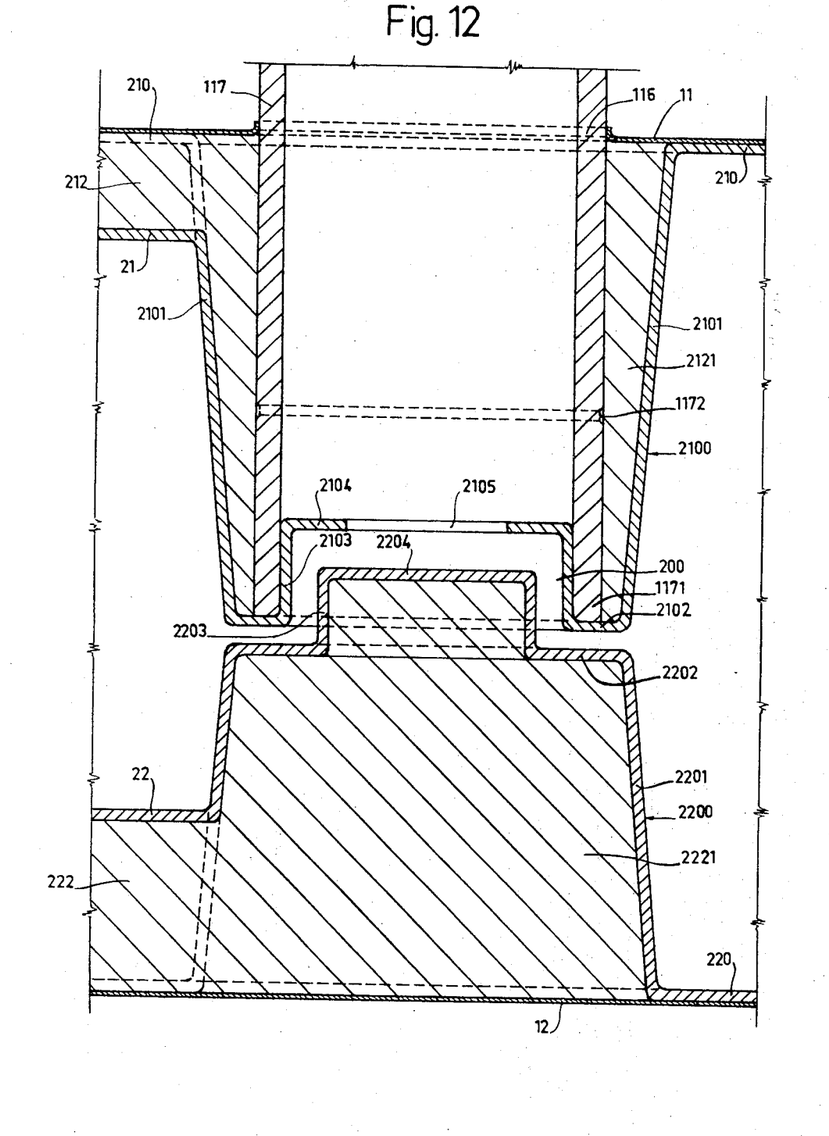
FIG. 12 is a section through that part of a tank comprising the fuel-inlet pipe.
Figure 13:
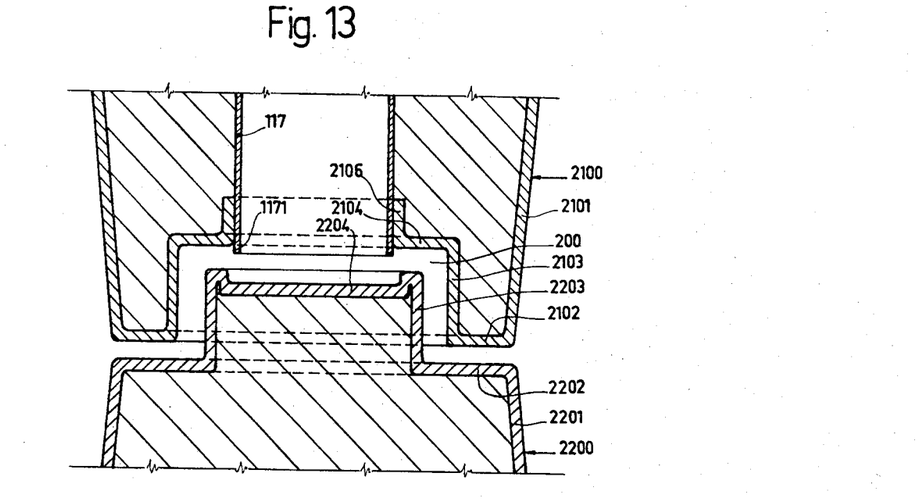
FIGS. 13 and 14 similarly show two modifications of the tank shown in FIG. 1.
Figure 14:
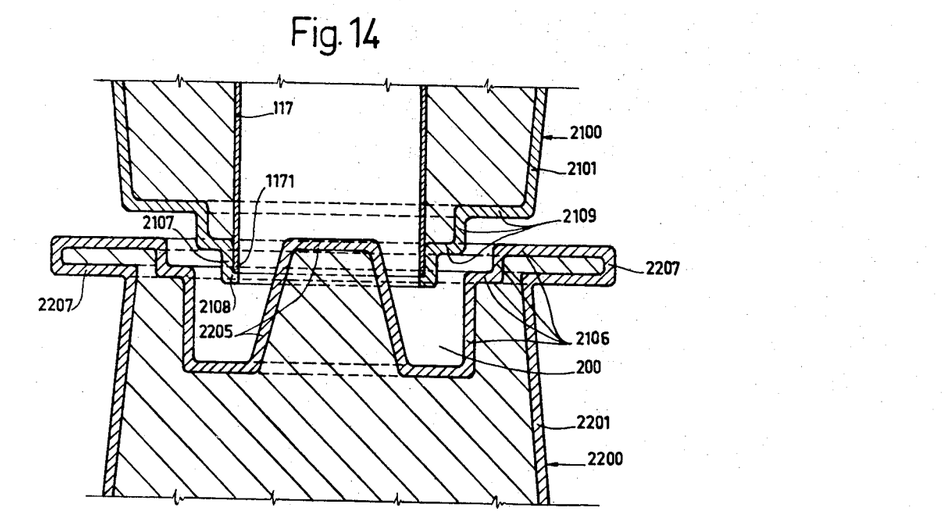

FIGS. 12 to 14 show how a filling tube that satisfies these requirements can be installed.

In the tank partly shown, the outer wall is made up of two half-walls, namely an upper half-wall 11 and a lower half-wall 12, which are assembled in non-liquid-tight manner. The inner wall also comprises two half-walls, namely an upper half-wall 21 and a lower half-wall 22, assembled by liquid-tight welding.

The upper metal half-wall is provided with a bore 116 for the passage of a filling tube 117. The upper half-wall 21, made up of plastics material, defines opposite the bore 116 a space 2121 limited by an element 2100 and turned towards the inside of the tank. The tube 117 extends through this space and opens onto a hole 2105 formed in the element 2100. That part of the space 2121 situated outside the tube 117 is occupied by the constituents which react together to give the foam when they are injected into the space between the two walls.

In the embodiment shown in FIG. 12, the space 2121 is defined at its upper end by the outer wall 11 and on its other sides by the element 2100 comprising the lateral frustoconical wall 2101, a base formed by a circular ring 2102 on which rests the end 1171 of the tube 117, a rising cylinder 2103 placed against the inner wall of the lower part of the tube 117 and a disc 2104 which is holed at 2105 and which is situated inside the tube. The disc may optionally be cemented to the cylinder 2103. The element 2100 is pre-formed in the inner wall 21 of the upper part of the tank.

It is possible in this way to obtain an assembly which is highly resistant to impact and withstands efforts to dislocate the tube because the filling elastomer has outstanding bond strength. The tube can comprise notches such as 1172 in order further to increase its resistance to dislocation.

The tube 117 can comprise a conventional charcoal filter for condensing the hydrocarbon vapors. It can also contain an anti-drip device. These elements are completely protected by the metal wall 11 against the action of dividing plates and against the action of any stones that may be thrown up.

The design of the base of the element 2100 as a baffle enables expansion of the fuel outside the tank in the event of impact to be limited.

With the same object in view, there is pre-formed in the inner lower wall 22 an element 2200 which can be similar in shape to the element 2100 and whose upper, small base comprises baffles consisting of a circular ring 2202, a rising cylinder 2203 and an upper disc 2204, these baffles being designed to cooperate with those of the elements 2100 to limit the liquid input to delivery by the tube 117 by increasing pressure in the space 200 between the elements 2100 and 2200. The throttling effect which this produces can be adjusted by varying the distance separating these elements and the number of baffles. The space 2221 defined by the element 2200 and the outer wall 21 is occupied after injection by the expanded foam. The cylinder defined by the wall 2203 and the upper disc 2204 penetrates into the lower part 1171 of the tube 117 and thus forms an anti-drip means.

A porous, permeable foam can be injected into the space 200 between the elements 2100 and 2200 in order even further to throttle the delivery rate. The constituents required for the formation of this foam are injected through the filling tube.

In the embodiment described, the tube 117 is fixed to the element 2100 by its inner wall. In the following embodiments, fixing is by way of the outer wall of the tube.

In FIG. 13, the element 2100 comprises a lateral frustoconical part 2101, a lower circular ring 2102, a rising cylinder 2113, an upper circular ring 2114 and an upper rising cylinder 2106 to whose inner wall is fixed the tube 117. The element 2200 of the lower wall is identical with that described in reference to FIG. 1, except that its upper disc 2204 is provided with a recess which, in cooperation with the lower end 1171 of the tube 117 which extends downwards beyond the upper ring 2104, enables throttling of the stream of fuel delivered into the space 200 to be increased.

In FIG. 14, the element 2100 comprises the same lateral frustoconical part 2101, a lower cylinder 2107 terminated at its upper end by a lug 2108 and a baffle 2109 joining these two parts. The tube 117 is fixed to the inner wall of the cyliner 2107 and at its lower end 1171 is supported by the lug 2108.

The element 2200 has a frustoconical lateral wall 2201 and a truncated cone 2205 joined by a baffle 2206 corresponding to the baffle 2109. The two baffles closely overlap one another so that the throttling of the stream of fuel delivered is very marked in the space 200. The truncated cone 2205 which penetrates into the lower part of the filling tube 117 forms an integral anti-drip device of extreme effectiveness.

A flat ring 2207 can be incorporated at the upper end of the lateral conical wall 2201 of the element 2200 of the lower half-wall 22, forming a valve capable of almost completely stopping the delivery of fuel in the event of impact. The fuel delivered flattens this ring against the lower end of the lateral conical wall 2101 of the element 2200 of the upper half-wall 21, thus ensuring almost complete closure of the space 200. The ring 2207 can be slightly undulated (not shown).

It is pointed out that the two elements 2100 and 2200, including the ring 2207, are obtained by thermo-forming of the two half-walls 21 and 22 so that they are substantially gratuitous. These elements are filled with plastic foam which provides them with high strength and provides for extremely effective fixing of the tube 117.

The composite hollow bodies described are suitable for general application. Thus, it is possible to produce in this way not only fuel tanks for road or rail vehicles, for ships or even for small aircraft, but also mobile tanks for water, liquid foods, chemical products and containers for universal application.

It will be understood that various changes and modifications can be made in the details of procedure, construction and use without departing from the spirit of the invention, especially as defined in the following claims.

I claim:

1. A method for the manufacture of mobile tanks for liquids wherein the tanks are equipped with at least one stabilizer and the tanks are formed of a metal outer wall, a plastic inner wall and a core of plastic foam comprising the steps providing a metal outer wall having an inner surface defining a substantially closed container and a pre-formed inner wall formed of a plastic material, with the inner wall having a portion corresponding to the inner surface of the outer wall and a portion defining at least one stabilizing baffle, positioning the inner wall over the inner surface of the outer wall whereby the portion of the inner wall corresponding to the inner surface of the outer wall is in surface contact therewith and the inner wall and the inner surface of the outer wall define a substantially closed space therebetween and supplying a foamable plastic material to the space to substantially fill the space with a plastic foam.

2. A method as defined in claim 1 wherein the inner wall also includes a portion which defines a substantially closed channel adjacent to the outer wall with the inner surface of the outer wall, said channel communicating with the space.

3. A method as defined in claim 1 wherein the inner wall includes a projection portion extending toward the interior of the tank, and the method includes the steps of forming an opening in the outer wall opposite the projection portion and introducing a tube through the opening prior to supplying foamable material whereby the outer wall, the inner wall and the tube define a space adapted to receive foamable material to form foam therein to throttle the flow of liquid supplied to the tank through the tube.

* * * * *